(No Model.)
G. H. COURSEN.
COMBINED TOBACCO PIPE AND CANE.
No. 395,426. Patented Jan. 1, 1889.
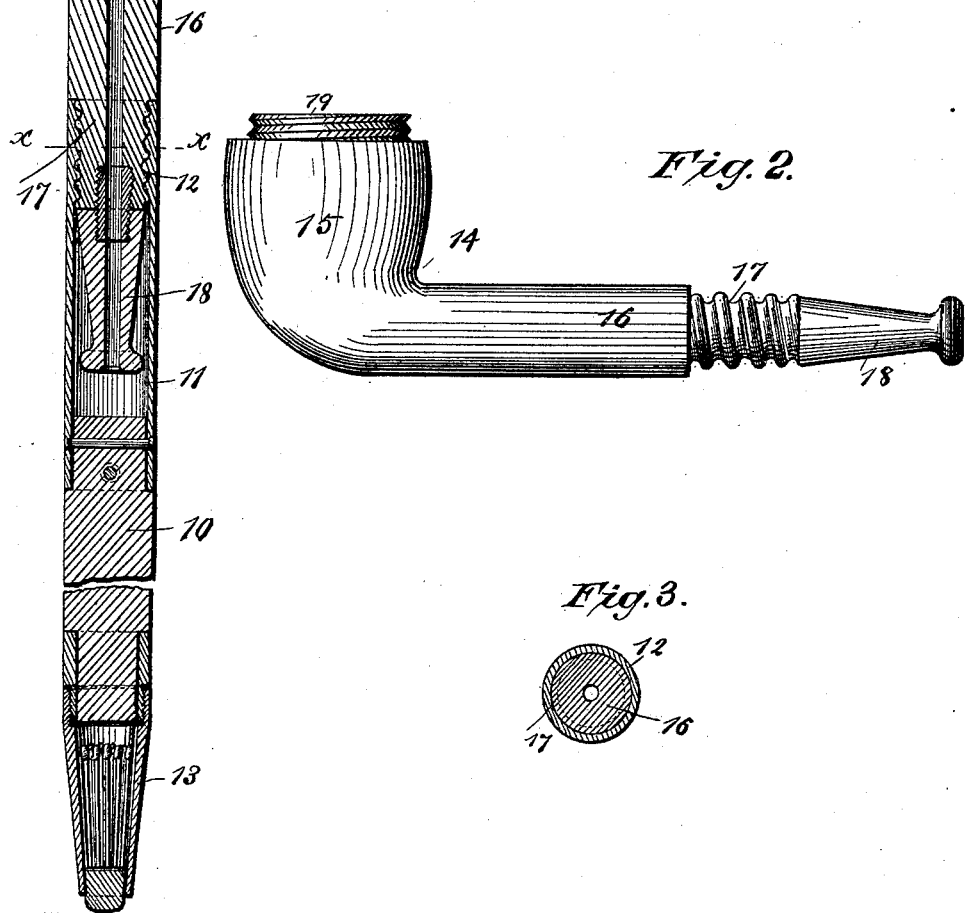

United States Patent Office.

GEORGE HAMPTON COURSEN, OF BALTIMORE, MARYLAND.

COMBINED TOBACCO-PIPE AND CANE.

SPECIFICATION forming part of Letters Patent No. 395,426, dated January 1, 1889.

Application filed July 2, 1888. Serial No. 278,768. (No model.)

*To all whom it may concern:*

Be it known that I, GEORGE HAMPTON COURSEN, of Baltimore, in the State of Maryland, have invented a new and Improved Combined Tobacco-Pipe and Cane, of which the following is a full, clear, and exact description.

My invention relates to a combined tobacco-pipe and cane, and has for its object to form the upper portion of a walking-cane into a detachable and complete tobacco-pipe, wherein the bowl will constitute the handle of the cane and the stem a portion of the stick; and the further object of the invention is to furnish a pipe that will be of the usual shape, either ornamental or plain, and which when the stick and pipe are united will constitute a cane that will be in every respect of appearance so like an ordinary cane as to attract no attention whatever, and which can be used on all occasions as such.

The invention consists in combining a tobacco-pipe with a cane to form the head thereof, and in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a longitudinal section through the coupled cane. Fig. 2 is a side elevation of the detached pipe, and Fig. 3 is a transverse section on line *x x* of Fig. 1.

The prime object of the invention, as aforesaid, is to so combine a tobacco-pipe with an ordinary walking-cane that the two together will form a cane scarcely, if at all, distinguishable from a simple cane, and wherein the detachable pipe will be of the ordinary shape of short wooden pipes, resembling the same in every particular when in use. To this end the staff or stick 10 of the cane is made about three or four inches shorter than customary and provided at the upper end with a rigidly-attached preferably metal collar, 11, the periphery of which collar is usually flush with the face of the staff, as best shown in Fig. 1.

The upper end of the collar is interiorly threaded, as shown at 12, the threads being preferably made large and round and not angular. A hollow ferrule, 13, is made to screw upon the bottom of the stick adapted to contain matches, as shown in Fig. 1. That portion of the cane adapted to constitute the head or handle 14 is shaped and bored to constitute a pipe-bowl, 15, and an integral stem, 16, at or about a right angle to the said bowl, the extremity of which stem is exteriorly threaded, as at 17, to screw into the collar 11. A mouth-piece, 18, is fitted upon the stem of the pipe in the usual manner, which, when the pipe is attached to the staff or stick, is concealed in the collar 11.

Around the outer end of the bore of the pipe-bowl an exteriorly-threaded flange or annular projection, 19, is formed, adapted to receive an interiorly-threaded cap or cup-shaped cover, 20, whereby the fact that the handle has a bore is concealed, and the contour of the said handle made essentially oval and given the appearance of being solid, as illustrated in Fig. 1.

I desire it distinctly understood that I do not limit myself to any particular material in the construction of the pipe-cane head, nor to any particular shape, as the material and design of the head may be varied to suit a multiplicity of tastes, and the screw-threads upon the pipe, which correspond to those in the collar, may partake of an ornamental nature, if desired.

When it is desired to use the pipe, the cover is unscrewed and the stem likewise detached from the staff.

By reason of the foregoing construction I am enabled to produce a cane which need not be of any unusual size or unusual appearance, and which will be strong in every way and useful as a cane, and wherein in a moment a well-shaped pipe may be taken therefrom and used as such.

Having thus described my invention, what I claim as new, and desire to secure by Letters Patent, is—

1. A walking-cane having a tobacco-pipe detachably secured to the upper end thereof, so that the bowl of the pipe will form the handle and the stem a portion of the cane, substantially as described.

2. The combination, with the staff of a walking-cane having a hollow upper end, of a tobacco-pipe having its stem detachably secured in the said hollow end of the cane, substantially as described, whereby the bowl of the pipe is made to form the handle and the stem of the pipe a portion of the cane, as set forth.

3. The combination, with the staff of a cane provided with a hollow upper end having an internal screw-thread, of a tobacco-pipe comprising a bowl and a stem, the stem being externally screw-threaded near its outer end to adapt it to be screwed into the hollow upper end of the cane, substantially as and for the purpose set forth.

4. The combination, with the staff of a cane and an internally-screw-threaded collar secured to the upper end of the staff, of a tobacco-pipe comprising a bowl, a stem integral with the bowl, and a mouth-piece, the stem being externally screw-threaded adjacent to the mouth-piece to adapt it to be screwed into the said collar, substantially as herein shown and described, whereby the parts can be readily attached and detached, and when connected the bowl of the pipe is made to serve as a head for the cane and the stem a portion of the staff of the same, as set forth.

GEORGE HAMPTON COURSEN.

Witnesses:
JAS. D. CASWELL,
CHESTER W. TAYLOR.